United States Patent [19]
> Fleming et al.

[11] 3,792,791

[45] Feb. 19, 1974

[54] SPEED RESPONSIVE GOVERNOR OPERATED SYSTEM FOR PUMP CONTROL

[75] Inventors: Charles L. Fleming, Brookfield; Milton E. Wege, Colgate, both of Wis.

[73] Assignee: Koehring Company, Milwaukee, Wis.

[22] Filed: Nov. 17, 1971

[21] Appl. No.: 199,625

[52] U.S. Cl. ............................ 214/762, 214/138 R
[51] Int. Cl. ............................................... E02f 3/86
[58] Field of Search ............ 214/138, 762, 763, 764

[56] References Cited
UNITED STATES PATENTS

| 2,842,273 | 7/1958 | Granryd | 214/762 |
|---|---|---|---|
| 3,542,228 | 11/1970 | Horsch | 214/762 |
| 3,095,990 | 7/1963 | Granryd | 214/762 |

*Primary Examiner*—Gerald M. Forlenza
*Assistant Examiner*—John Mannix
*Attorney, Agent, or Firm*—Andrew J. Beck

[57] ABSTRACT

A mechanical governor is connected by a flexible shaft to the main engine for a mobile construction machine for sensing the speed of such engine. The governor is connected by a linkage to the control arm of a modulating air valve positioned in the air control circuit for the hydraulic dig pump between the pump and the operator's manual control in the cab of the machine. Spring-loaded means on the governor can be manually adjusted to alter a set-point at which the governor influences the modulating air valve.

As the hydraulic horsepower requirements increase during the work cycle of the machine, the main engine will tend to slow down. The governor, through the flexible shaft, senses this change in engine speed, or revolutions per minute, and moves the control lever on the modulating air valve to decrease the air pressure supplied to the hydraulic dig pump control. The reduction in air pressure controls the destroking of the hydraulic pump and reduces the hydraulic horsepower output to a level that can be satisfied by the output of the main engine. Accordingly, the speed responsive governor will eliminate engine stall-out under peak load conditions, and thus allow the operator to maintain full system hydraulic pressure at all times with attendant increases in the productivity of the machine and in the ease of controlling same.

13 Claims, 6 Drawing Figures

3,792,791

SPEED RESPONSIVE GOVERNOR OPERATED SYSTEM FOR PUMP CONTROL

BACKGROUND OF THE INVENTION

The instant invention finds particular utility in mobile construction machines, such as back hoes, which include, inter alia, a tractor including a cab with manual controls situated therein, a frame for supporting the tractor, hydraulically driven tracks for propelling the tractor, a boom extending outwardly from the tractor and pivotally secured thereto, a dipper arm pivotally secured on the boom, and a bucket pivotally secured to the forward end of the arm. The boom is raised or lowered by a pair of hydraulic cylinders, the dipper arm is shifted by another hydraulic cylinder, and the movement of the bucket is controlled by yet another hydraulic cylinder. The horizontal movement of the tractor and the propelling force for the tracks require hydraulic motors. All of the hydraulic cylinders are supplied with pressurized fluid from various hydraulic pumps driven by the main engine. Consequently, the capacity of the main engine must be sufficient to meet the maximum contemplated horsepower requirement for operating the hydraulic cylinders and motor. Maximum horsepower is demanded whenever the movement of boom, dipper arm or bucket is impeded by an extra heavy load or by an immovable object. If the load on the engine is not dropped almost instantly, the engine will usually stall.

Numerous attempts have been made to overcome engine stalling under adverse conditions, and some of these attempts are discussed in detail hereinafter. One theoretical approach to insuring the avilability of maximum horsepower at all times would appear to be to substantially increase the capacity of the main engine. However, as a practical consideration, an increase in the size of the main engine would take up additional space on the tractor of the machine, and space is a sorely rationed commodity on the tractor; problems would also be encountered in evenly distributing the weight of the larger engine. Also, an increase in engine size would result in substantial increase in both initial machine costs and in continuing operating costs for the increased capacity of a larger engine would only be called into play at infrequent intervals, and would hardly compensate for the significant problems attributable to the increase in size, weight and cost.

As a more practical approach, U.S. Pat. No. 3,606,049, issued on Sept. 20, 1971 to Richard O. Gordon, proposed a hydraulic horsepower limiting system adapted to shift to low horsepower operation whenever the pressure of the hydraulic fluid in any part of the system exceeds a predetermined level. This is achieved by using a plurality of double, fixed volume pump assemblies to provide the hydraulic fluid to operate the cylinders for the boom, dipper stick and bucket, and auxiliary motors for other machine functions. Each fixed volume pump assembly includes a high volume-low pressure and a low volume-high pressure pump. The high volume pump in each assembly is cross-connected with the low volume pump of another assembly to provide the required hydraulic fluid to operate one of the hydraulic cylinders or motors up to the operating pressure of the high volume pump. A pilot operated valve responds to the pressure of the low volume-high pressure pumps to by-pass the high volume-low pressure pumps whenever this pressure exceeds the operating pressure of the high volume pump. Since the low volume pump requires less horsepower to operate, the total horsepower consumption is reduced in this manner to a compatible level within the capacity of the main engine.

As another practical approach, manufacturers of mobile construction equipment have employed large variable volume pumps with appropriate destroking mechanisms to limit the horsepower required from the main engine by reducing the volume of hydraulic fluid and by increasing the pressure of the hydraulic fluid in the pump. One destroking mechanism, used by the assignee of the instant application, employed electric over air relay valves that sensed the hydraulic pressure, tripped the electric relay valve and signalled a valve that reduced the air pressure to the pump control, thus destroking the variable volume pump. Under adverse field conditions on construction sites, dust and dirt caused frequent shorts in the electric circuits; hence, the operators would disconnect the pressure sensing system and operate the construction machine without such system. The effective operation of the machine would then depend upon the skill and expertise of the operator who had to sense or anticipate the occurence of engine stall conditions and respond almost immediately thereto by proper manipulation of the manual controls in the cab of the machine. Since stall conditions are usually caused by bucket contact with an immovable object in a trench, out of the line of sight of the machine operator, even the most skilled operator is hard pressed to sense or anticipate such conditions and manually operate the destroking mechanisms properly without benefit of auxiliary hydraulic pressure sensing systems.

Other destroking mechanisms have employed devices that read or sense the hydraulic pressure output of the variable volume pumps, apply the sensed pressure against a pre-set spring and as the spring collapses, the destroking mechanism for the pump is actuated. Obviously, the spring can only approximate the horsepower curve of the main engine in a rudimentary fashion; thus the destroking mechanism may operate inefficiently and waste horsepower or it may cause excessive engine slow down with a resultant drop in machine productivity. Additionally, the spring setting is inflexible and can not be adjusted to account for shifts in the horsepower curve for the main engine caused by altitude, fuel, engine condition and other factors, further limiting the efficiency of the destroking mechanism.

SUMMARY

Thus, with the shortcomings of known horsepower limiting control circuits for mobile construction machines clearly in mind, the instant invention contemplates a speed responsive governor oprated control system to enable the machine to follow the actual horsepower curve of the main engine and utilize the maximum available horsepower for increased productivity. The governor operated control system sums the total horsepower requirement of the machine and matches such sum to the maximum actual engine capability. These desirable operational characteristics are attributable to the unique speed responsive governor control system which detects a decrease in engine speed caused by a maximum load and immediately begins destroking a variable volume pump that controls the performance of a machine function.

The instant invention further contemplates an efficient governor operated control system that is unaffected by dust and dirt encountered on the job site and functions effectively despite such adverse conditions. The governor operated control system can be manually adjusted to account for shifts in the actual horsepower curve due to altitude, fuel, engine conditions and other external factors and to destroke the pumps in accordance with such shifts. In contrast to the versatility and wide operating range of the instant governor operated control system, known destroking mechanisms and hydraulic horsepower limiting systems operate upon a theoretical horsepower curve which can not be shifted to take into account the actual operating conditions noted above.

Furthermore, the instant governor operated control system is relatively simple in design and is operatively associated with only one variable volume pump, specifically the dig pump. In contrast thereto, the horsepower limiting hydraulic control circuit disclosed by Gordon requires the complex cross-coupling of a plurality of fixed volume pumps for controlling the boom, the dipper stick, the bucket, etc.

The instant governor operated control system for destroking variable volume pumps assumes the form of a speed responsive mechanical governor driven by the main engine or pump drive case power take-off so as to sense engine speed, a modulating air valve, a linkage interconnecting the governor and a control arm for the modulating air valve; an air operated relay valve, and a pilot connected to the throttle for the engine for supplying air to the pilot to control the air operated relay valve. As the engine slows down, the governor senses such condition and moves the control arm for the modulating air valve to proportionately reduce the air pressure passing through the relay valve and the modulating valve to the pump control and thus destroke the pump. When the throttle shows that the engine is idling, the pilot for operating the relay will receive sufficient air pressure to overcome the normal bias of the air operated relay; consequently, the relay will be shifted to permit the pump control air to by-pass the pressure reducer and flow directly to the pump control. At any throttle setting other than idling, the air pressure supplied to the pilot operated relay will be insufficient to shift the relay; thus, the air will pass through the relay valve and thence through the pressure reducing valve before reaching the pump control. The degree of pressure reduction will be determined by the position of the control arm linked to the governor, which, in turn, is responsive to the speed of the main engine.

Other significant advantages of the instant governor operated control system will become apparent from the following description of a preferred embodiment of the invention when construed in connection with the appended drawings.

DESCRIPTION OF THE PREFERRED EMBODIMENT

Figure 1:
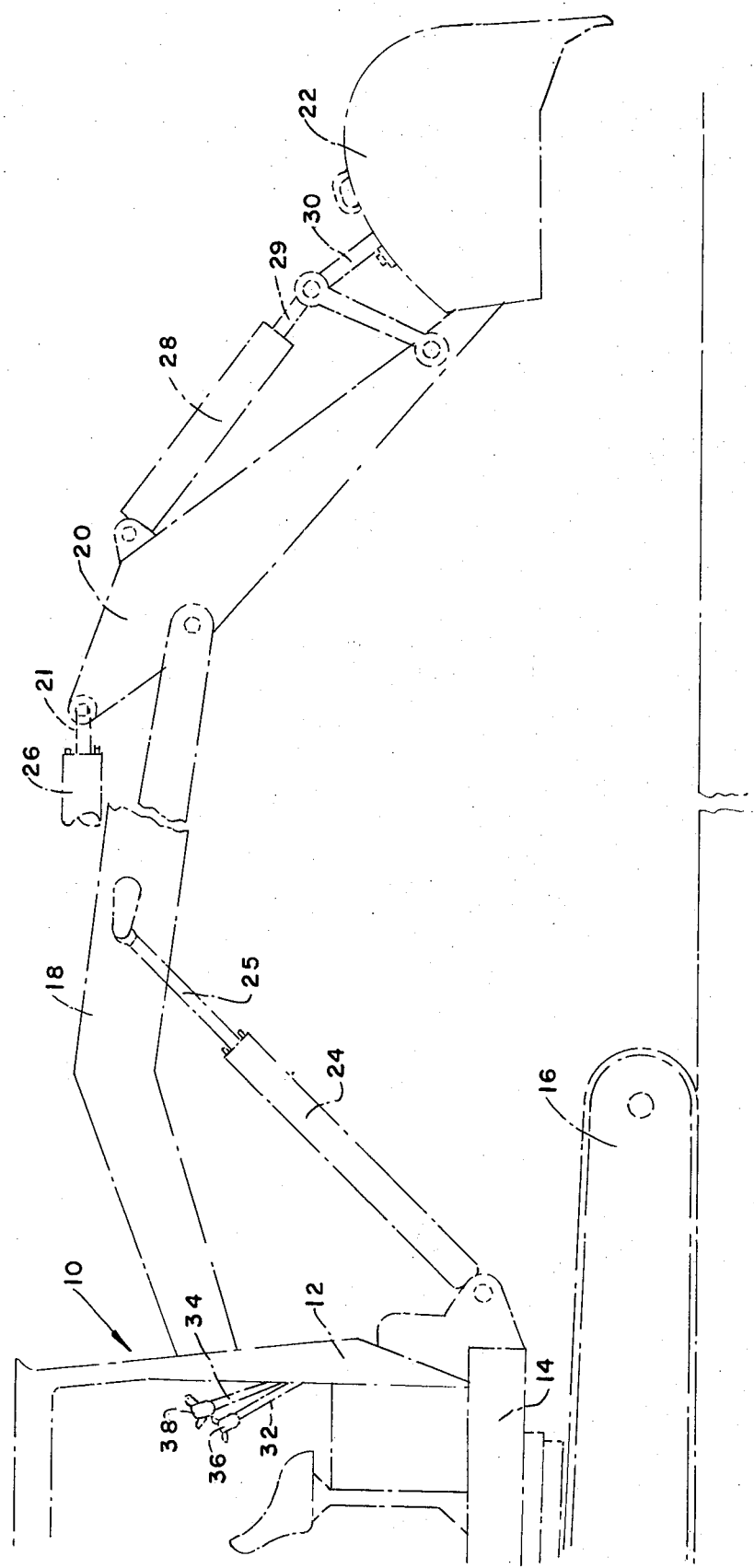
FIG. 1 is a side elevational view, with portions broken away, of a mobile construction machine utilizing the instant invention.

A governor operated control system constructed in accordance with the principles of the instant invention is adaptable to a wide variety of mobile construction machines; however, for the sake of illustration, the governor operated control system is shown and described as an integral part of a back hoe. The back hoe, portions of which are shown in outline in FIG. 1, is identified generally by reference numeral 10 and includes a tractor 12, a supporting frame 14, endless tracks 16 for propelling the machine, a boom 18 pivotally mounted to the tractor, and a dipper arm 20 pivotally secured to the boom. Dipper 22 is pivotally mounted upon the forward end of arm 20 for excavation and pipe laying purposes.

A pair of hydraulic cylinders 24 (only one of which is visible in FIG. 1), control the movement of boom 18 through the extension, and retraction, of piston 25. A third hydraulic cylinder 26, which is secured at its rear end to boom 10 and is secured at its forward end to dipper arm 20, controls the movement of the arm through the extension, and retraction, of piston 27. A fourth hydraulic cylinder 28, which is secured at its upper rearward end to arm 20, and is secured at its forward end to crank 30, controls the movement of dipper 22 through the extension, and retraction of piston 29. Control levers 32 and 34 are situated in the cab of the machine, and handballs 36 and 38 are secured to the upper end of the levers which influence the operation of the hydraulic cylinders in a conventional manner. The main engine, which is not shown in FIG. 1 but is schematically represented in FIG. 7, is located behind cab 10. One suitable engine would be the four-cycle diesel engine produced by The Caterpillar Co. and identified as Model No. D336A-TA; such engine can produce 400 horsepower at 2,000 r.p.m. Another suitable engine would be the two-cycle diesel engine produced by General Motors and identified as Model 12V-71; such engine can produce 360 horsepower at 2,100 r.p.m.

Figure 2:
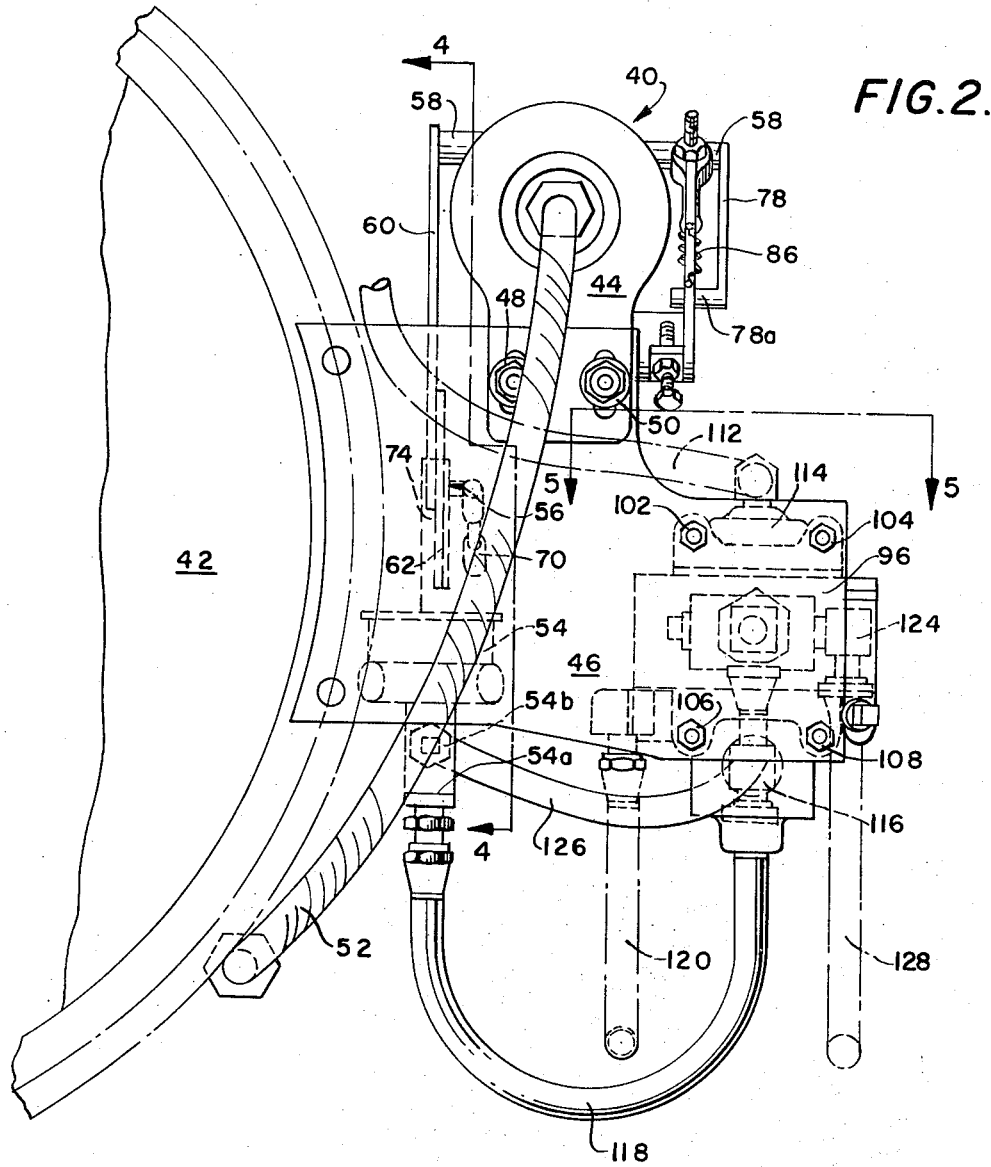
FIG. 2 is a front elevation view of a governor operated control system constructed in accordance with the principles of the instant invention.
Figure 3:
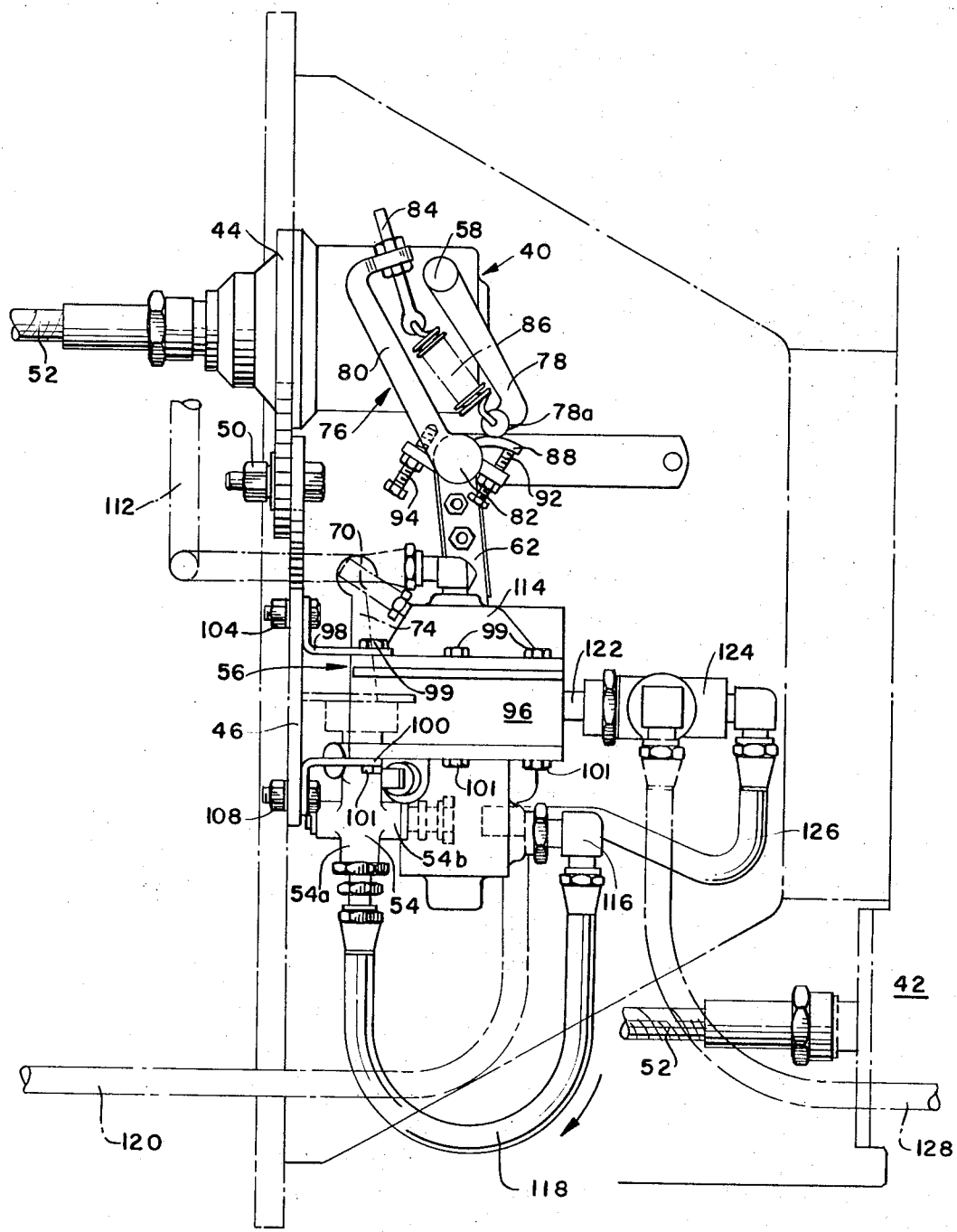
FIG. 3 is a side elevation view for a governor operated control system.

FIGS. 2 and 3 depict the unique governor operated control system employed with the mobile construction machine. The governor control system includes a governor, indicated generally by reference character 40, that is held in operative position adjacent to the housing 42 for the engine by main support 44. Support 44, in turn, is joined to auxiliary support 46, by a pair of bolts 48 and 50. A flexible shaft or cable 52 senses or reads the revolutions per minute, or speed of the main engine and mechanically transmits this information to governor 40. The governor, in turn, is connected to a control arm for a pressure reducing or modulating valve 54 by a linkage indicated generally by reference numeral 56.

Figure 4:
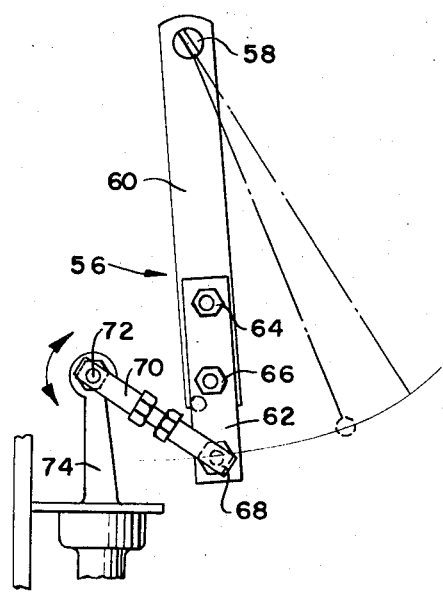
FIG. 4 is a side view of the linkage interconnecting the governor and the control arm for a modulating valve; such view being taken along line 4—4 in FIG. 2 and in the direction indicated.

Linkage 56, which is also shown in greater detail in FIG. 4, comprises a shaft 58 which extends through the housing of the governor, a first depending member 60 and a second depending member 62 secured thereto by bolts 64 and 66. Linkage 56 further includes link 70, which is connected at one end to depending member 62 by bolt 68 and at the opposite end by bolt 72 to control arm 74 for modulating valve 54.

Returning again to FIGS. 2 and 3, the mechanism for manually adjusting the set-point of governor 40 to match shifts in the horsepower curve of the main engine is fully shown on the opposite end of shaft 58. The adjustment mechanism, which is indicated generally by reference numeral 76, includes a first lever 78 mounted for pivotal movement about shaft 58 and a second lever 80 mounted for pivotal movement about shaft 82. An adjustable pin 84 extends through the horizontal extension of lever 80, and a spring 86 extends between the pin and the lower end of lever 78 which terminates in a stub shaft 78a. Shaft 78a bears against extension 88 of lever 80. Adjustable set screws 92 and 94 are provided to alter the set-point of governor 40; the set-point, in turn, determines the point at which the governor will respond to the speed of the engine and begin to destroke the variable volume pump.

An air operated relay valve 96 is secured to auxiliary support 46 by braces 98 and 100 which are held in place by spaced bolts 102, 104, 106 and 108.

Figure 5:
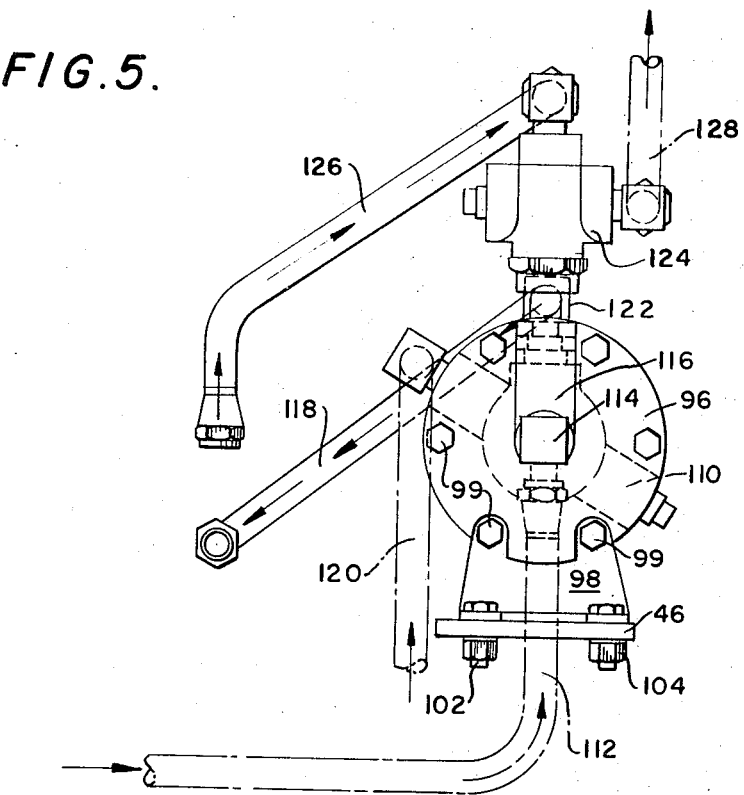
FIG. 5 is a plan view of an air operated relay valve forming an integral part of the governor operated control system, such view being taken along line 5—5 in FIG. 2 and in the direction indicated.

FIGS. 3 and 5 show the constructional details of air operated relay valve 96 and the manner in which such valve is associated with the other components of the governor operated control system. Valve 96 is secured to auxiliary support 46 by brackets 98 and 100 and bolts 102, 104, 106 and 108. Bracket 98 is secured to the valve by six spaced bolts 99 and bracket 100 is secured to the valve by six spaced bolts 101. An air-operated cylinder 110 seen in dotted outline in FIG. 5, is located within the housing for valve 96.

Figure 6:
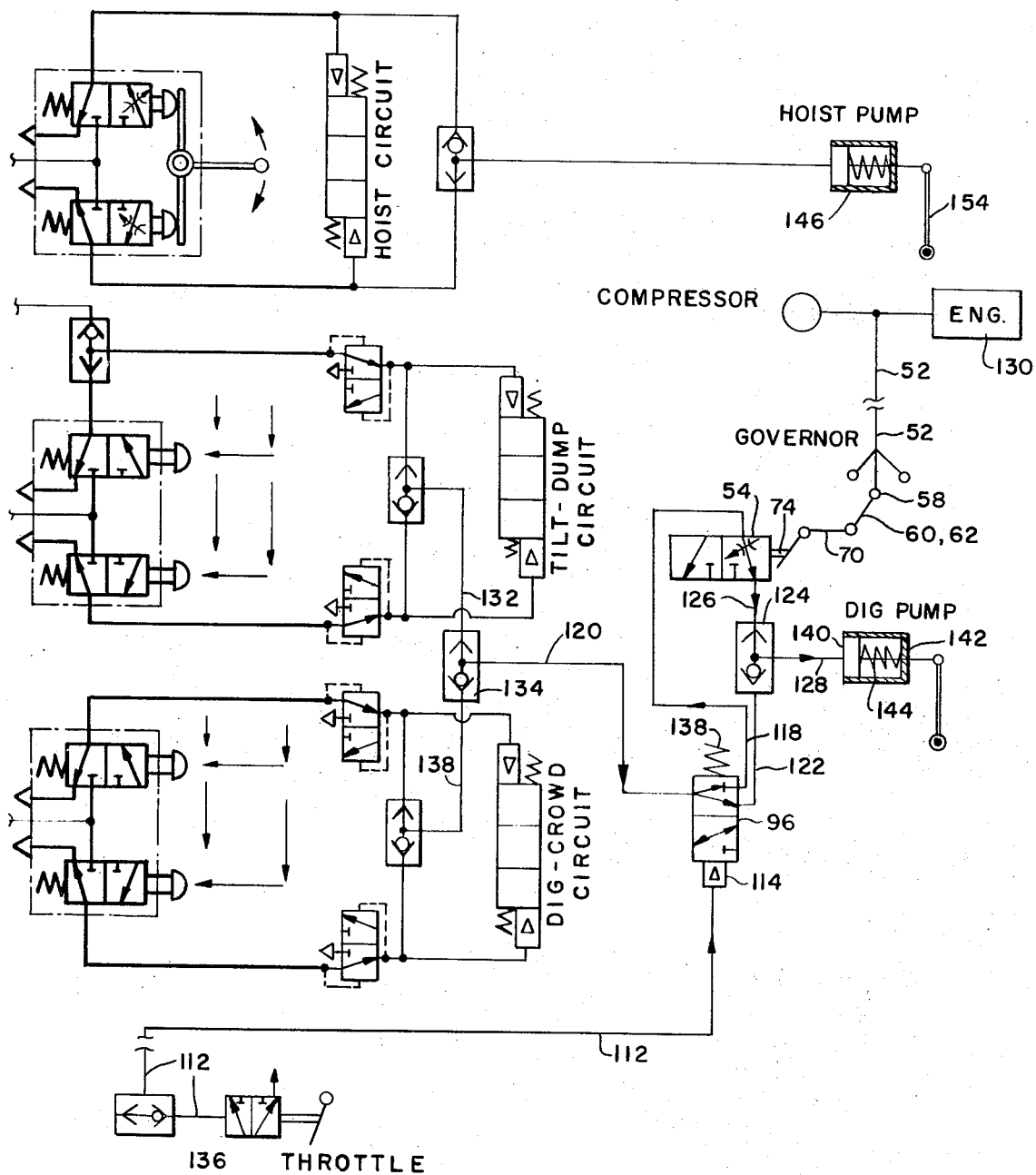
FIG. 6 is a schematic view of those portions of the pneumatic control circuitry operatively associated with a pair of variable volume pumps for controlling the performance of two machine functions.

Conduit 112 introduces air from the engine throttle, which is shown schematically in FIG. 6 into pilot 114, which is situated atop the housing for the relay valve. When the engine of the machine is operating against a load, the air pressure supplied to pilot 114 will be unable to overcome the spring-loading on cylinder 110 and the air will flow downwardly from pilot 114 into tank 116, from where the air will then be delivered over conduit 118 to the bottom port 54a of the pressure reducing or modulating valve 54. The air entering port 54a will cooperate with control arm 74 that has been adjusted by governor 40 through linkage 56 to produce a variable pressure signal at side port 54b that is proportional to the speed of the engine. Such signal passes through port 54b into by-pass conduit 126 and then to check valve 124, and, lastly, to conduit line 128 which supplies control air to the dig pump.

Under load conditions, the cylinder 110 normally blocks the passage of pressurized air introduced over supply conduit 120 from flowing directly through the housing of valve 96. The pressurized air then moves downwardly into tank 116, over conduit 118, and then to bottom port 54a of valve 54, where the pressurized air combines with the air from pilot 114. Under no load or idle condition, cylinder 110 is shifted by the combination of forces produced by pressurized air in conduit 120 and full throttle air in pilot 114, the air passes directly through the housing of valve 96 and exits at the rear thereof (see FIGS. 3 and 5) into exhaust conduit 122 which leads directly into check valve 124 and thence into conduit 128 which leads to the dig pump without any reduction into pressure level. It will be appreciated that the pressurized air is supplied at a level of 85 p.s.i. and that the normal opposing spring bias is of only slightly greater magnitude. Consequently, the addition of full flow of pilot air of small magnitude, when combined with the pressurized air, is just sufficient to shift cylinder 110. At any condition other than idle, the pilot will be diminished and the spring will bias cylinder 110 to its blocking position.

CYCLE OF OPERATION

The cycle of operation for the instant governor operated control system is described with particular reference to the schematic views of FIG. 6 which tie together the structural relationships found in FIGS. 1–5. FIG. 6 schematically interrelates governor 40, modulating valve or pressure reducer 54, linkage 56, control arm 74 for valve 54, and air operated relay valve 96, as the main engine 130 works against a load and the engine speed slows down from its full throttle, or idle condition. Engine 130 also drives a compressor 131 that supplies air under pressure to the pneumatic control circuitry in a conventional fashion. The reduction in engine speed is transmitted by flexible cable 52 to governor 40, which has been manually adjusted by adjustment mechanism 76 (see FIG. 3) to account for shifts in the horsepower curve of the main engine. When the engine slow down reaches the predetermined speed air engine which governor 40 has been set to respond, governor 40 rotates shaft 58 and member 60 secured thereto (see FIG. 4). Member 60 and member 62 pivot counterclockwise as a unit and exert a turning moment upon arm 70 which is translated into an axial movement of control arm 74. The extent of axial movement of control arm 74 determines the variable resistance applied to modulating valve 54. Thus, the magnitude of the resistance is related directly to the speed of main engine 130 as sensed by flexible cable 52 and transmitted to governor 40.

Air from the pneumatic circuit for controlling the tilt-dump operations of the machine flows over conduit 132 into check valve 134 and shifts the valve to block entry of pressurized air from the pneumatic circuit for controlling the dig-crowd circuit. The air leaving check valve 134 enters supply conduit 120 which is connected to an inlet port for air operated relay valve 96, passes therethrough, and exits over conduit 118 which leads the air signal to pressure reducer or modulating valve 54. Pilot 114 is receiving an air signal from throttle 136, but since the throttle has been adjusted to account for a load condition, the air signal is reduced below full throttle. Consequently, the combined pressure of the reduced air signal in conduit 112 and the greater pressure signal in supply conduit 120 is insufficient to overcome the usual biasing force of spring 138.

The variable restriction in valve 54, i.e. control arm 74, has already been adjusted so that the level of the pressure signal leaving valve 54 over conduit 126 and entering check valve 124 is proportionately reduced. The air flow leaving valve 124 enters conduit 128 and exerts a force upon one face of a flexible diaphragm 140 that is movable within hydraulic cylinder 142. Hydraulic fluid is supplied to the pumps from a tank on the machine in a conventional manner. The air flow against one face of the diaphragm works against the hydraulic force and/or a bias of spring 144 on the opposite face. The summation of these forces varies the volume of hydraulic fluid contained within the hydraulic cylinder; thus, the greater the pressure of the air signal, the greater the volume of hydraulic fluid displaced and delivered to the hydraulic cylinders mounted on the machine frame (see FIG. 1) for performing machine functions. The hydraulic fluid displaced from cylinder 142 is delivered to hydraulic cylinder 28 for extending piston 29 and achieving a digging operation with bucket 22; thus cylinder 142 may be considered to represent the "dig" pump.

While the puneumatic circuit for controlling the variable volume pump operatively associated with the dig function has been substantially altered in a unique manner, the pneumatic circuit for controlling the variable volume pump 146 operatively associated with the hoist function has not been similarly altered, as shown in FIG. 6. The remaining pneumatic circuitry for the machine has not been changed from known designs and thus is omitted in the interest of clarity.

FIG. 6 depicts the operation of the pneumatic circuitry for the dig pump when main engine 130 is operating under no load condition and throttle 136 is set for idle operation; thus, throttle 136 delivers full air pressure over conduit 112 to pilot 114. The air signal from either the tilt-dump circuit or the dig-crowd circuit enters check valve 134 and shifts the blocking element accordingly. The air signal leaves check valve 134 over supply conduit 120 and enters relay valve 96. The air signal combines with the full throttle signal delivered to pilot 114 to overcome the bias of spring 138 and to shift cylinder 110 away from its normal blocking position. Consequently, the air signal leaves valve 96 at an exit port other than the exit port indicated in FIG. 6 and passes into conduit 122 which leads directly to check valve 124 and by-passes pressure reducing or modulating valve 54. From check valve 124 the air signal passes into conduit 128 which introduces the signal to one face of flexible diaphragm 140 that is movable within hydraulic cylinder 142. Since the pressure of the air signal supplied over conduit 120 has not been reduced during its travel, diaphragm 40 is flexed to its maximum extent and the dig pump delivers the maximum volume of hydraulic fluid to hydraulic cylinder 28 for extending piston 29 and moving bucket 22.

Manifestly, numerous modifications, omissions and refinements in the above described circuitry and the governor operated control system will become apparent to the skilled artisan from the foregoing description. To illustrate, the flexible diaphragms in the variable volume pumps could readily be replaced with pistons and the air signal and hydraulic pressures could exert forces on the opposite faces thereof. Additionally, the check valves might assume numerous forms; ball valves, shuttle valves, or fluidic, bistable valves would work with equal facility. Flexible cable 52 need not be connected directly to the shaft of the main engine to sense engine speed; the cable can be taken off from a gear box or pump drive mounted in line with the main engine. Further, the governor operated control system may be operatively associated with more than one variable volume pump. Finally it will accordingly be understood that the foregoing description illustrating the use of a pneumatic-hydraulic system for controlling and actuating tool functions is merely illustrative as either pneumatic, hydraulic or electric systems alone or in combination are embraced within the scope of this invention and defined with reference to the appended claims.

We claim:

1. In combination, a mobile construction machine including a tool movably mounted on the machine, a main engine, a compressor, said engine driving said compressor to provide pressurized air, a source of hydraulic fluid, variable volume hydraulic pump means, air-actuable control means for regulating the output of said pump means, conduit means for delivering pressurized air to said pump control means; said pump means being connected to the source of hydraulic fluid for pressurization therefrom, at least one hydraulic cylinder with a piston mounted therein, said piston being operably connected with the tool for performing a machine function, said pump means supplying varying amounts of hydraulic fluid to said hydraulic cylinder to control the movement of the piston and the tool operated thereby, the improvement comprising:

modulating valve means connected in said conduit means for regulating the pressure of the air delivered to said pump control means, and speed responsive control means operably connected to said main engine and said modulating valve means to positively shift said modulating valve means to reduce air pressure in response to a predetermined decrease in the speed of of said engine, as may be caused by the tool encountering resistance, to prevent stalling of said engine.

2. In combination a mobile construction machine including a tool movably mounted on the machine, a main engine, a compressor, said engine driving said compressor to provide pressurized air, a source of hydraulic fluid, variable volume hydraulic pump means, air-actuable control means for regulating the output of said pump means, conduit means for delivering pressurized air to said pump control means; said pump means being connected to the source of hydraulic fluid for pressurization therefrom, at least one hydraulic cylinder with a piston mounted therein, said piston being operatively connected with the tool for performing a machine function, said pump means supplying varying amounts of hydraulic fluid to said hydraulic cylinder to control the movement of the piston and the tool operated thereby, the improvement comprising:

modulating valve means connected in said conduit means for regulating the pressure of the air delivered to said pump control means, and speed responsive control means operatively connected between said main engine and said modulating valve means to adjust said valve means in accordance with the speed of said engine to prevent stalling of said engine;

said speed responsive control means including a flexible cable driven by said engine and a governor driven by said cable.

3. The combination of claim 2 wherein adjustable means are provided for the governor to alter the speed at which said governor will respond to the engine speed.

4. The combination of claim 3 wherein said adjustable means comprises a shaft extending through the housing for said governor, a first lever secured thereon, a second lever mounted for pivotal movement disposed in proximity thereto, and spring means for biasing said levers toward one another.

5. The combination of claim 4 wherein adjustable set screws are provided to change the position of said levers relative to one another.

6. The combination of claim 2 wherein a control arm is operatively associated with said modulating valve means, and a linkage connects said arm to said governor.

7. In combination, a mobile construction machine including a tool movably mounted on the machine a main engine, a compressor, said engine driving said compressor to provide pressurized air, a source of hydraulic fluid, variable volume hydraulic pump means, air-actuable control means for regulating the output of said pump means, conduit means for delivering pressurized air to said pump control means; said pump means being connected to the source of hydraulic fluid for pressurization therefrom at least one hydraulic cylinder with a piston mounted therein, said piston being operatively connected with the tool for performing a machine function, said pump means supplying varying amounts of hydraulic fluid to said hydraulic cylinder to control the movement of the piston and the tool operated thereby, the improvement comprising:
 modulating valve means connected in said conduit means for regulating the pressure of air delivered to said pump control means,
 speed responsive control means operatively connected between said main engine and said modulating valve means to adjust said valve means in accordance with the speed of said engine to prevent stalling of said engine; and
 air-operated relay valve means connected in said conduit means at a location upstream of said modulating valve means.

8. The combination as defined in claim 7 wherein said air-operated relay valve means includes inlet means and outlet means, and a pilot-operator supplied with a variable pressure signal, said inlet means connected to a source of pressurized air, a shiftable cylinder within the housing of said valve means, and a spring normally urging said cylinder into a blocking position to prevent the passage of air from said inlet means to said outlet means.

9. The combination of claim 8 wherein said cylinder is shifted from its blocking position against the urging of the spring when the combined pressure of the maximum variable pressure at the pilot operator and the air received from the source of pressurized air exceed the force of the spring.

10. The combination of claim 8 wherein the pilot operator for said air-operated relay valve means is disposed atop the housing for the relay means, and a tank is disposed below the housing for the relay means, said tank receiving the air that is normally blocked by said cylinder.

11. The combination of claim 10 wherein a by-pass conduit connects said tank to said modulating valve means.

12. A power implement comprising:
 engine means;
 a movably mounted tool;
 power means connected to said tool for moving said tool;
 fluid pressurizing means driven by said engine for pressurizing fluid;
 conduit means fluidly interconnecting said fluid pressurizing means and said power means for actuating said power means;
 modulating valve means operably disposed for varying the volume of fluid supplied to said power means; and
 governor means operably connected to said engine and said modulating valve means for positively shifting the latter to reduce the volume of fluid supplied to said power means in response to a predetermined decrease in engine speed, as may be caused by the tool encountering resistance, to prevent said engine from stalling.

13. Apparatus according to claim 12 and further including relay valve means operably disposed in said conduit means for blocking flow of pressurized fluid to said modulating valve means while said engine is in a preselected mode of operation.

* * * * *